July 31, 1962 J. L. RAMM 3,047,288
AUTOMATIC ARTICLE REVERSING MECHANISM
Filed Sept. 11, 1958 13 Sheets-Sheet 1

INVENTOR
JOSEPH L. RAMM
BY
ATTORNEY

July 31, 1962 — J. L. RAMM — 3,047,288
AUTOMATIC ARTICLE REVERSING MECHANISM
Filed Sept. 11, 1958 — 13 Sheets-Sheet 2

INVENTOR
JOSEPH L. RAMM
BY
ATTORNEY

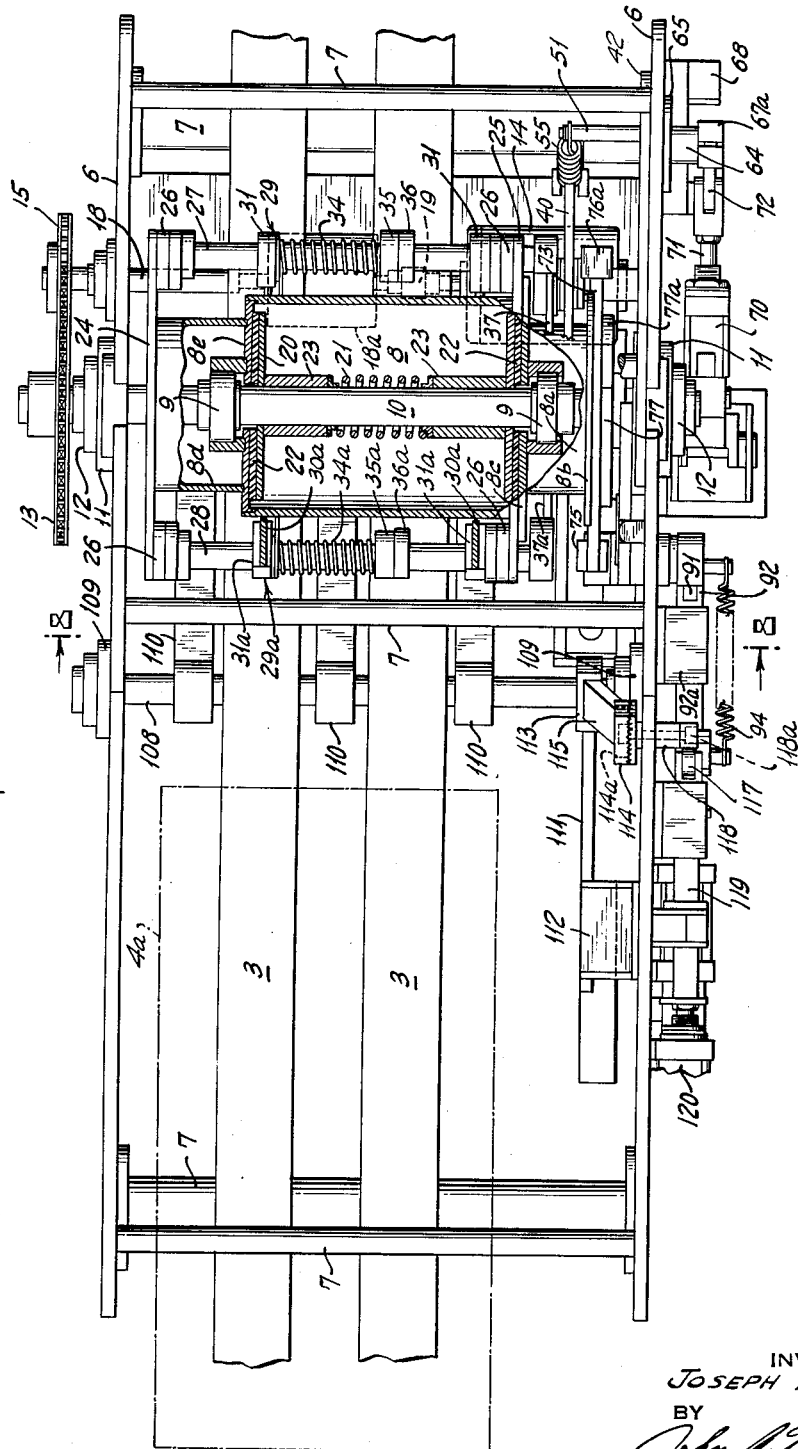

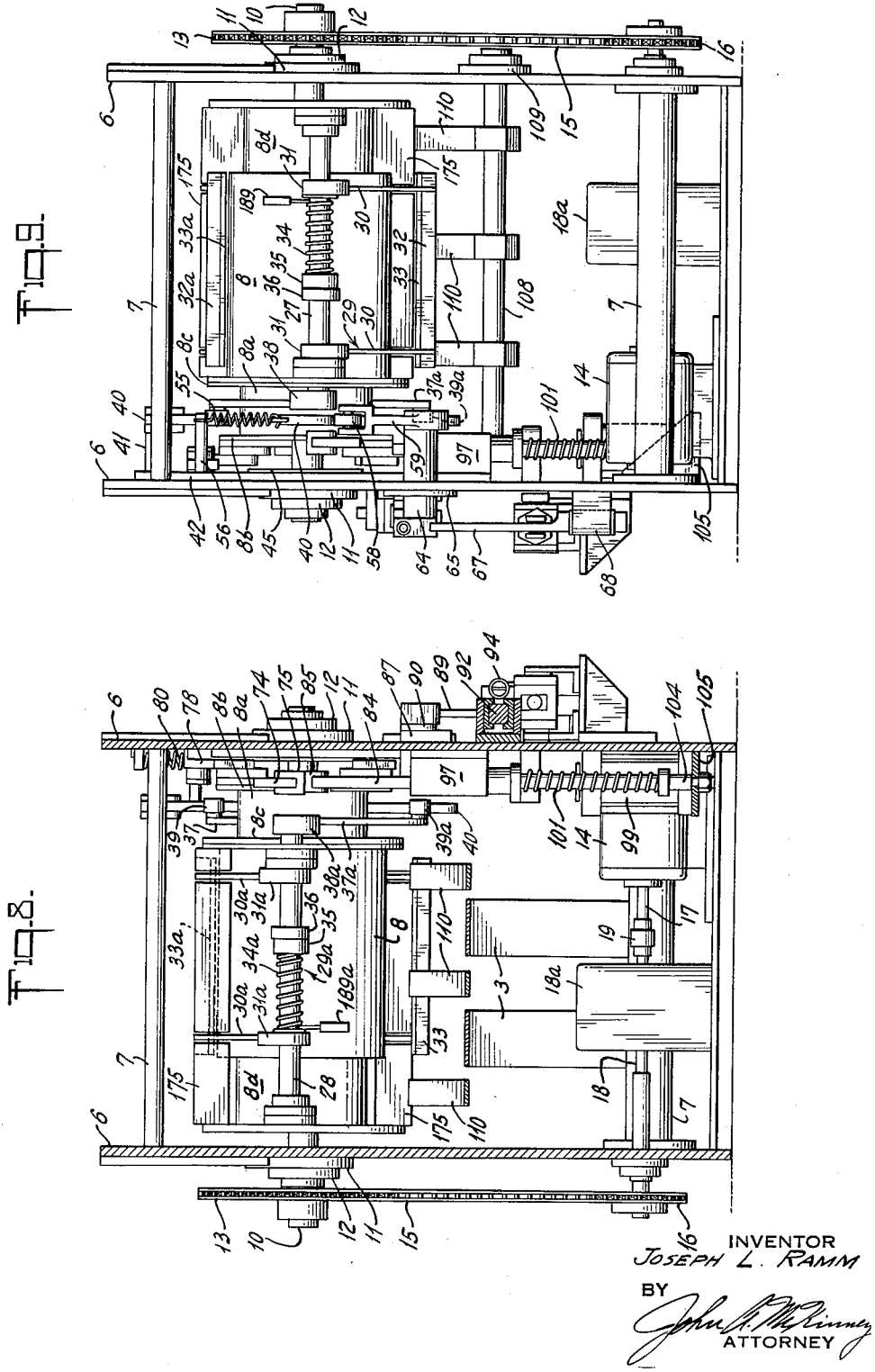

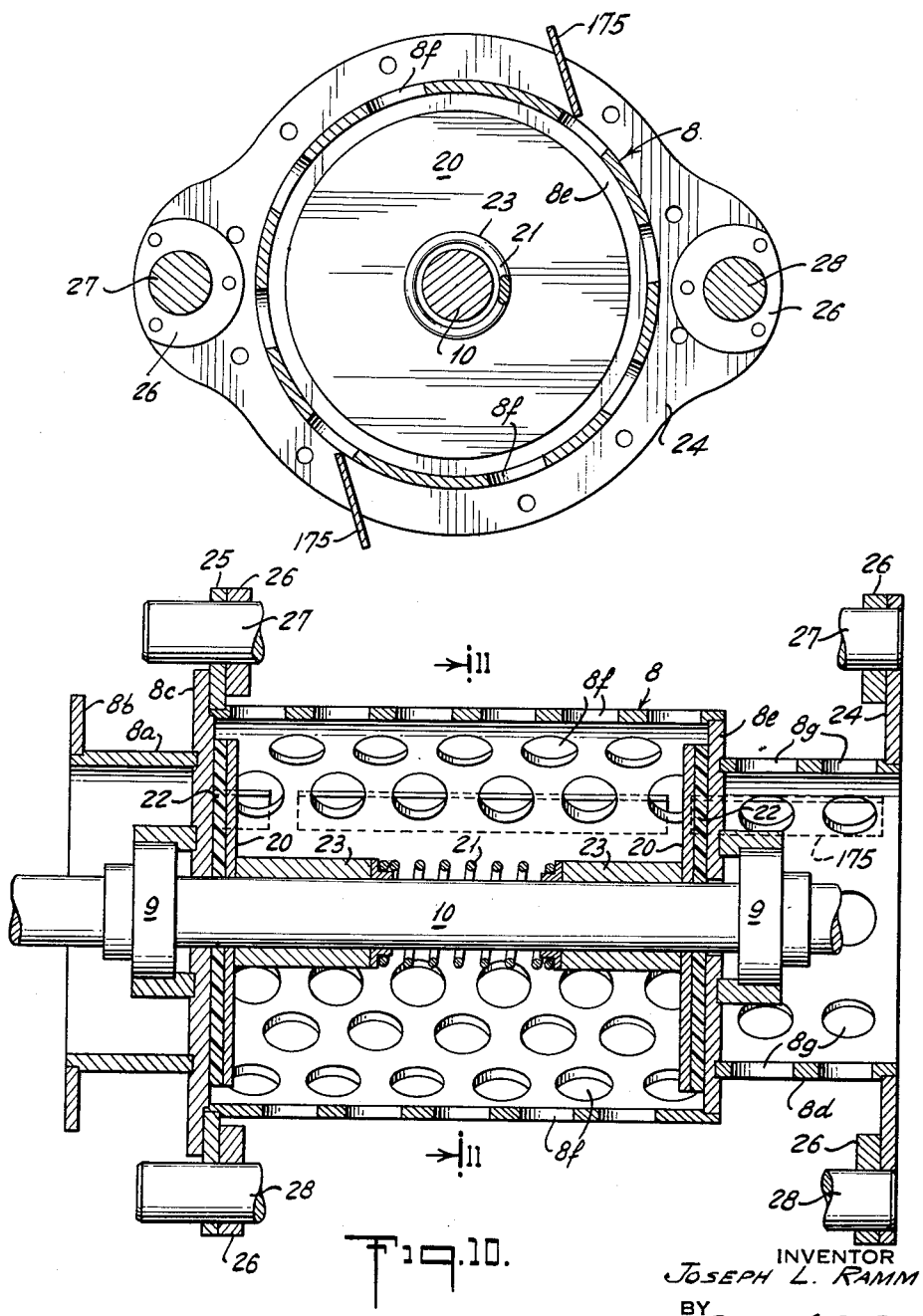

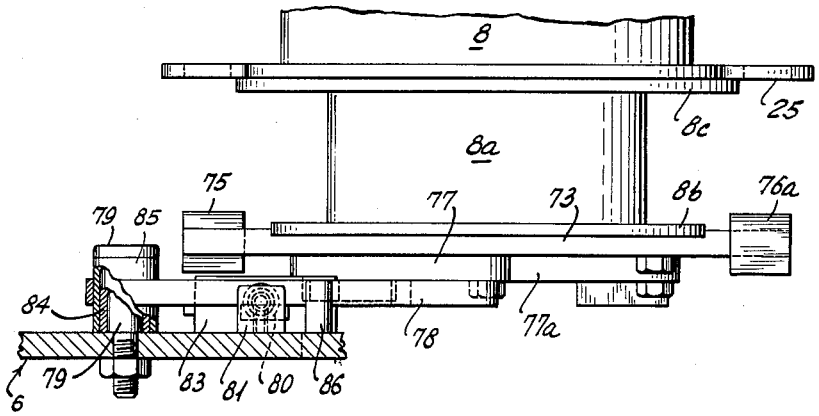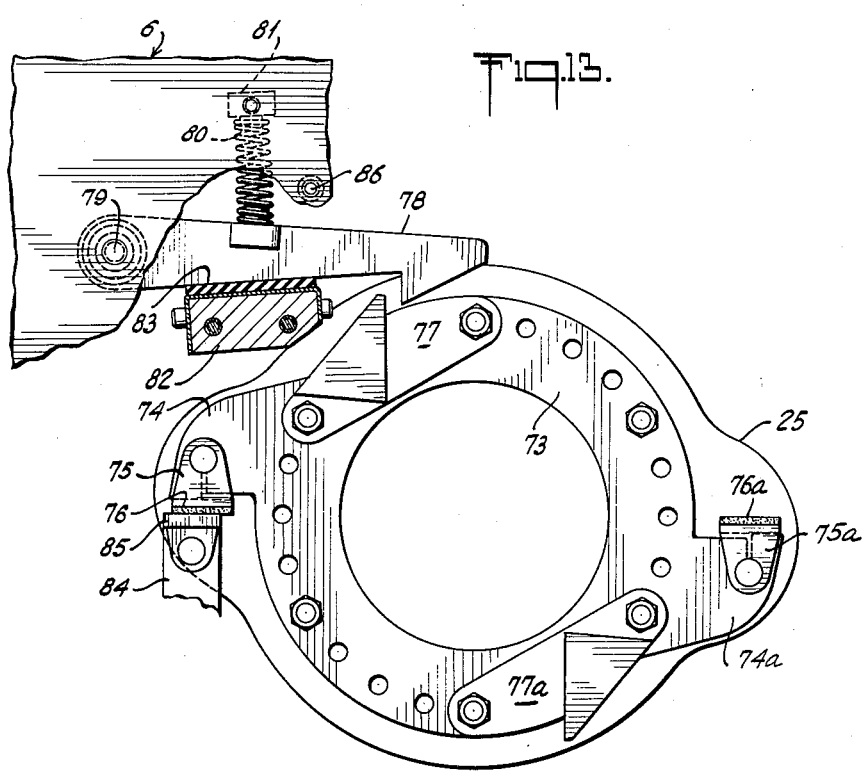

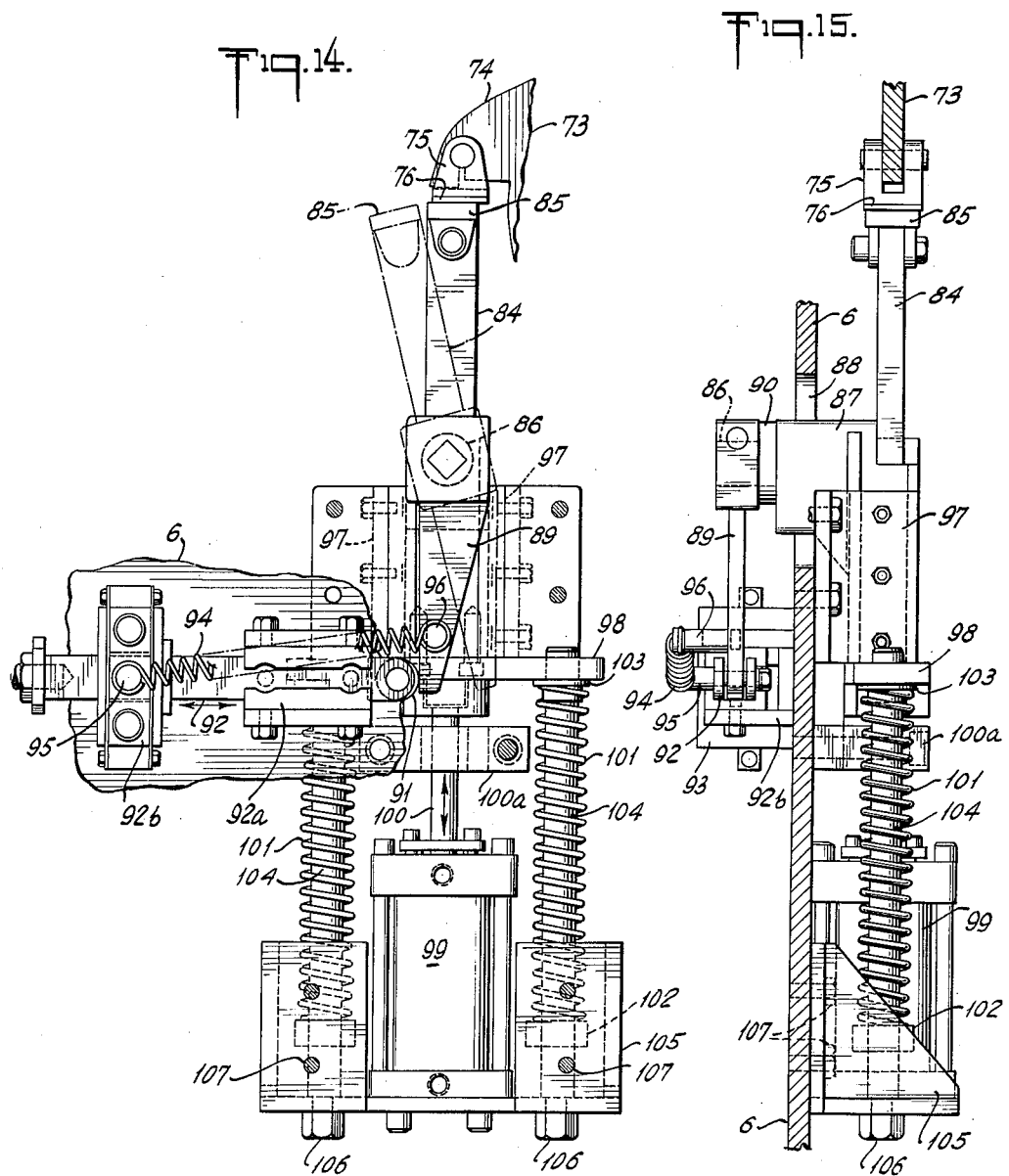

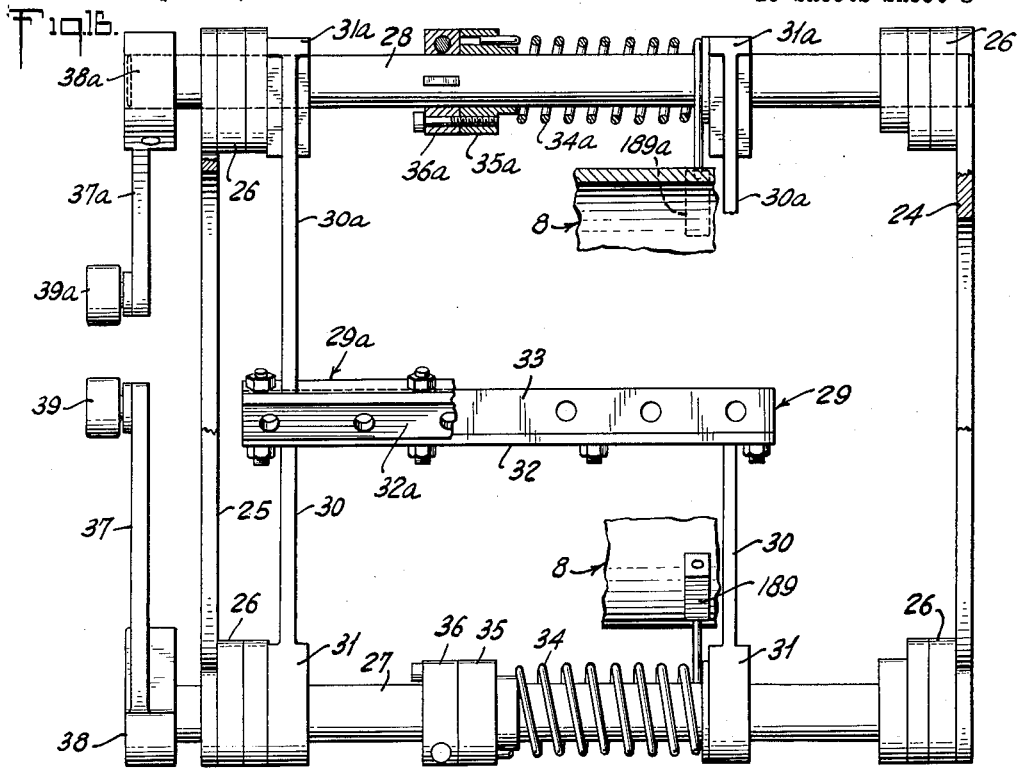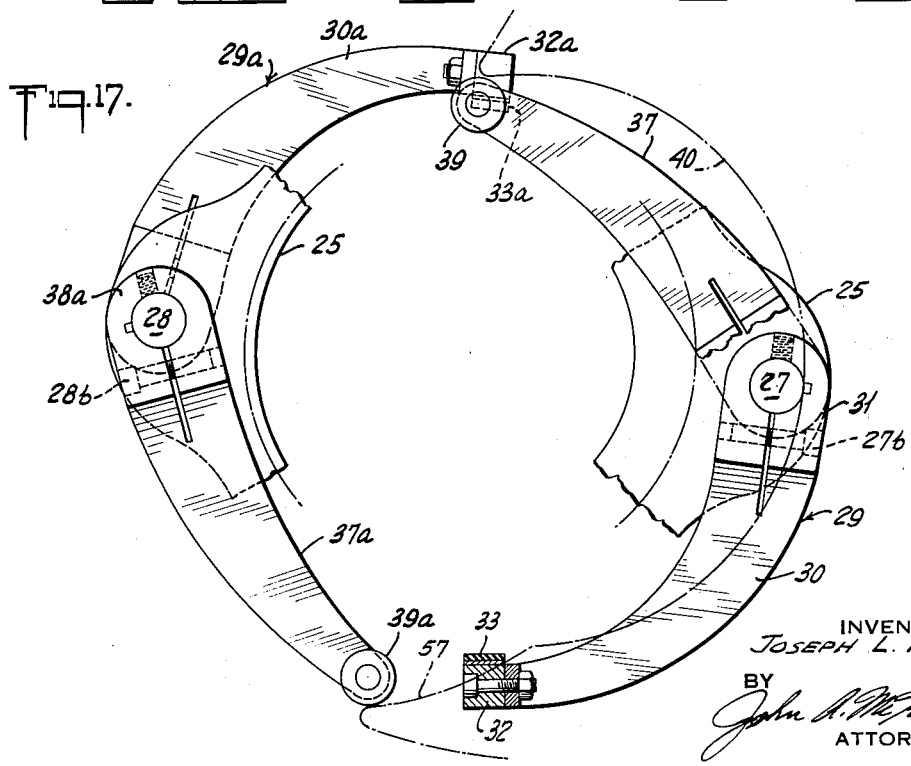

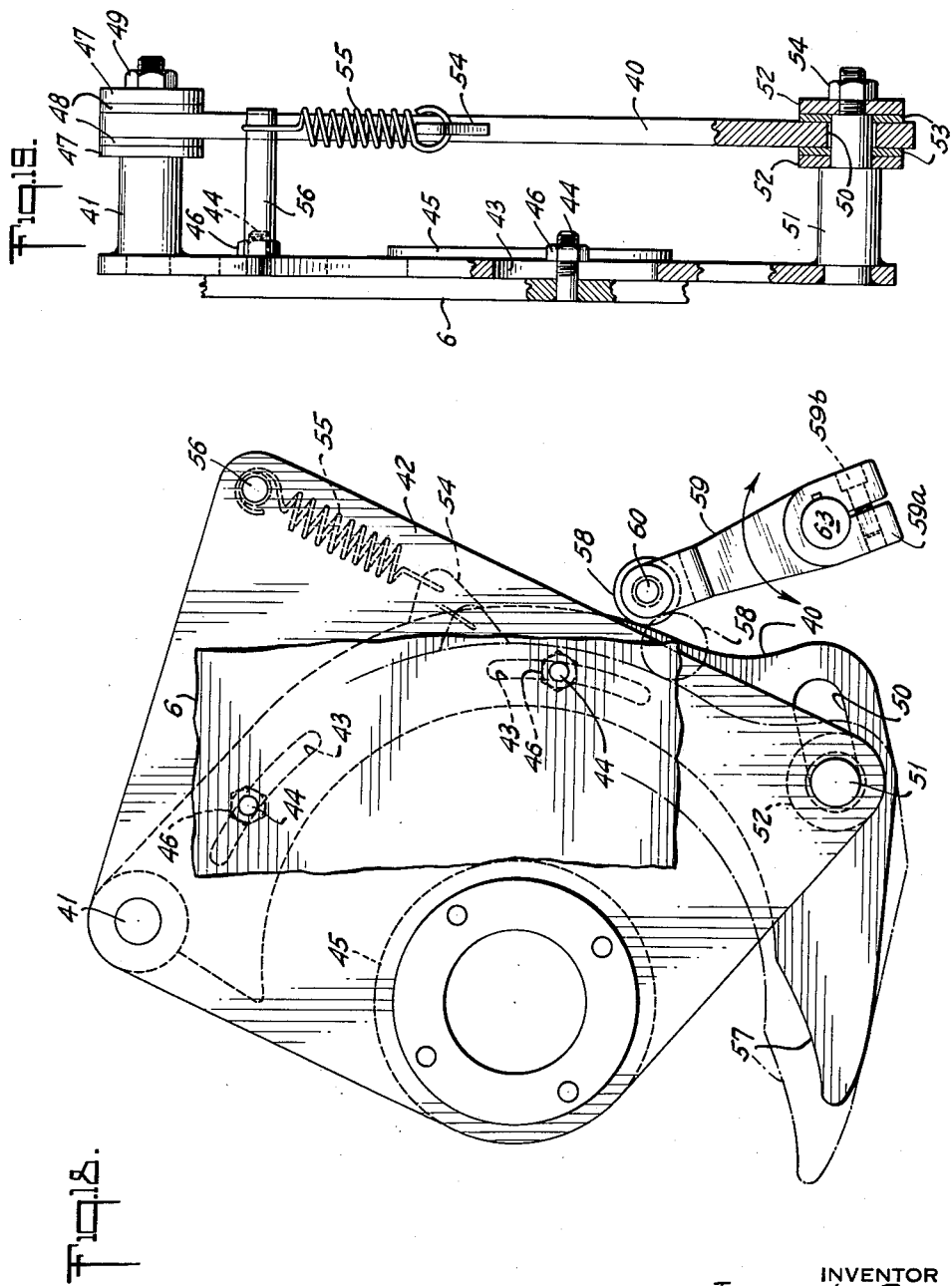

July 31, 1962  J. L. RAMM  3,047,288
AUTOMATIC ARTICLE REVERSING MECHANISM
Filed Sept. 11, 1958  13 Sheets-Sheet 10
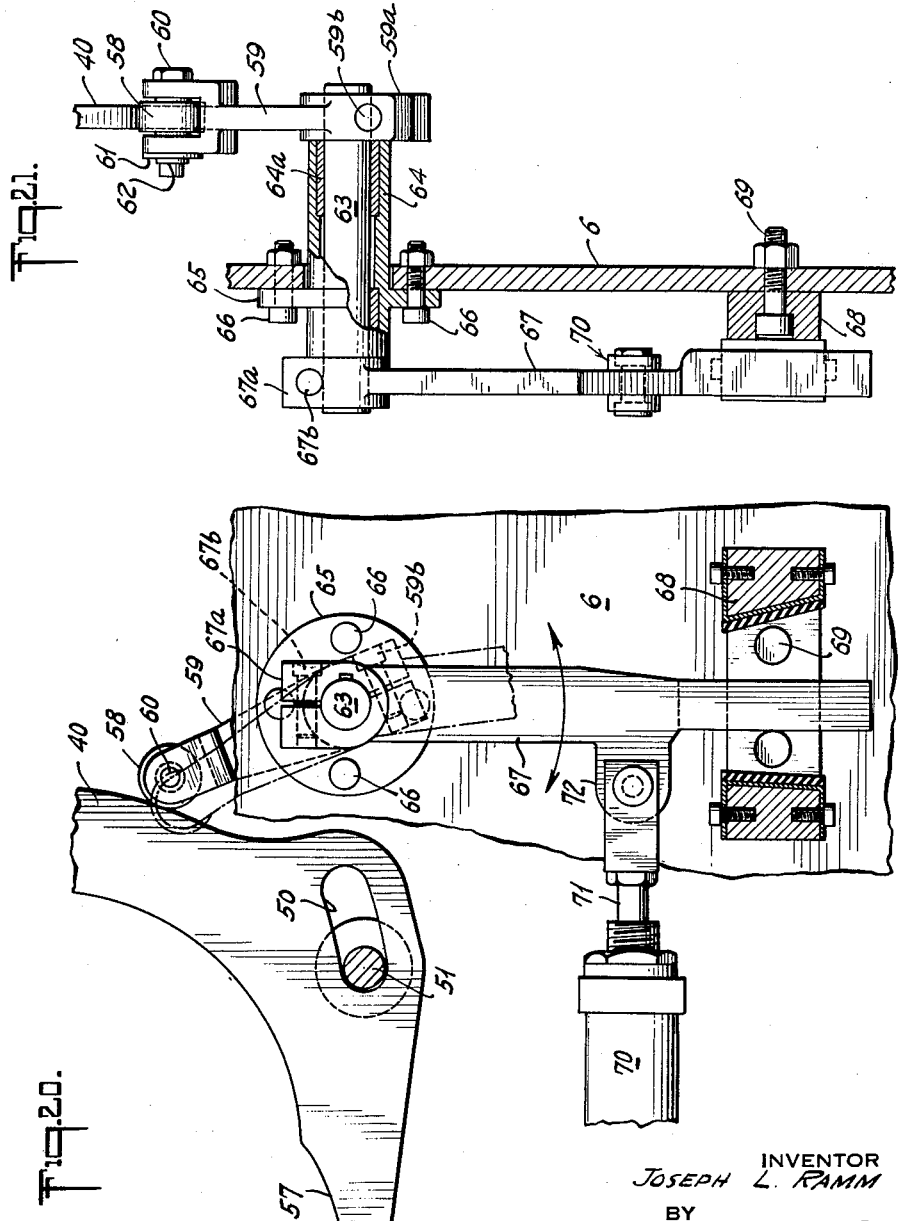
INVENTOR
JOSEPH L. RAMM
BY
ATTORNEY July 31, 1962 J. L. RAMM 3,047,288
AUTOMATIC ARTICLE REVERSING MECHANISM
Filed Sept. 11, 1958 13 Sheets-Sheet 11

INVENTOR
JOSEPH L. RAMM
BY
ATTORNEY

July 31, 1962 J. L. RAMM 3,047,288
AUTOMATIC ARTICLE REVERSING MECHANISM
Filed Sept. 11, 1958 13 Sheets-Sheet 12

INVENTOR
JOSEPH L. RAMM
BY
ATTORNEY

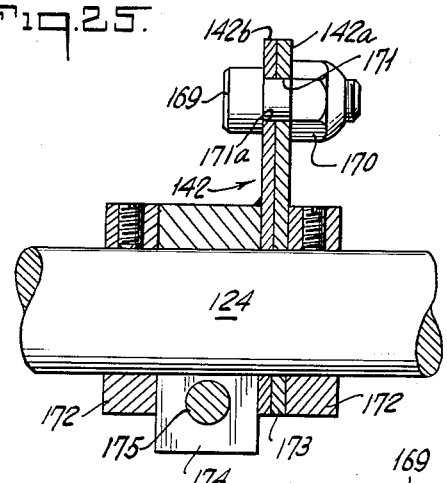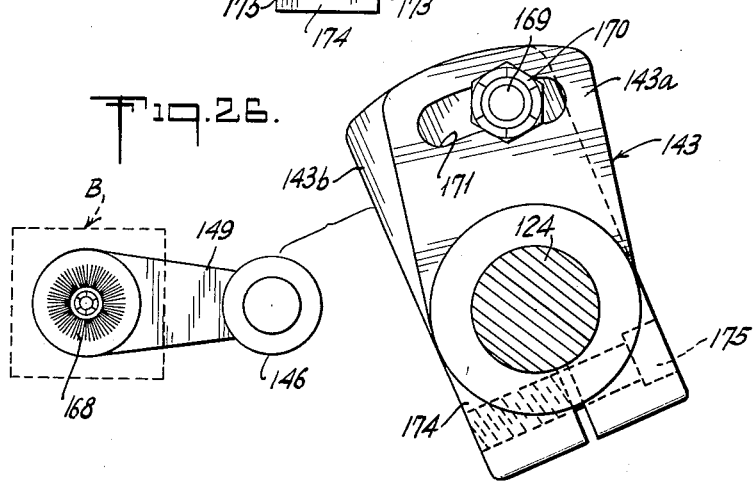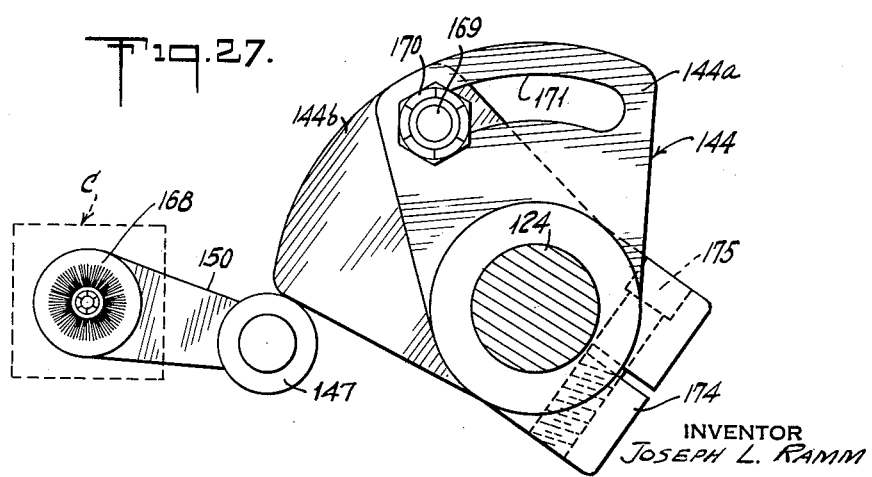

United States Patent Office 3,047,288
Patented July 31, 1962

3,047,288
AUTOMATIC ARTICLE REVERSING MECHANISM
Joseph L. Ramm, New Orleans, La., assignor to Johns-Manville Corporation, New York, N.Y., a corporation of New York
Filed Sept. 11, 1958, Ser. No. 760,373
28 Claims. (Cl. 270—58)

This invention relates to an automatic mechanism for flipping or reversing articles of manufacture, such as roofing and siding shingles and the like, conveyed by a belt system in an assembly-line process.

In some manufacturing processes, it is required that an article of manufacture conveyed by a continuous belt system be reversed with respect to the belt. This is necessary so that the article can be further processed on its reverse side or, as in the case of some asphalt shingle processes, so that it may be paired with another shingle in a certain predetermined manner, as for example, front face to front face. This pairing is usually required for such shingles due to the nature of their coatings, which dictates a particular packaging arrangement.

Heretofore, this reversal of the article of manufacture on the conveyor belt system has been done either manually or by a secondary conveyor belt system. With the manual methods, the disadvantages are, more or less, obvious, as, for example, continuing high cost, possibility of injuries to personnel, required training of personnel to perform a particular operation, etc. With the secondary conveyor belt system, on the other hand, it is necessary that the entire, main conveyor line be redesigned to accommodate this added equipment. Likewise, the secondary conveyor system has not been too effective in some installations, more particularly where pairing is involved, due to the fact that it is difficult to compensate for all exigencies that may arise which cause improper pairing or improper reversal of the articles. For example, the spacing between adjacent shingles must be fairly exact at all times or the pairing is not properly effected. Rejects, taken from the belt, create gaps, or alter the spacing, which results in pairing shingles mating with such gaps rather than with corresponding shingles.

Accordingly, it is an object of this invention to provide an automatic article flipping or reversing mechanism which can be utilized in existing assembly line structures for manufacturing shingles and the like.

Another object of this invention is to provide a mechanism which automatically continues to pair shingles accurately, without need of further adjustment for such pairing, upon resuming production after halts of the conveyor line due to a malfunction or after the creation of gaps between successive articles.

An additional object of this invention is to provide a mechanism which is capable of automatically reversing every article in an assembly-line process efficaciously.

A further object of this invention is to provide a shingle reversing and pairing mechanism which is unaffected by shingle spacing in its timing operation.

It is an additional object of this invention to provide novel cooperating mechanism for flipping assembly-line articles to their reverse side and for novel timing mechanism utilized with the flipping mechanism.

In brief, this invention provides for an automatic article flipping or sheet or shingle turn-over mechanism which can be added to existing fabricating conveyor systems without extensive modification of such systems. It comprises an intermittently rotating drum having attached thereto an article clamping mechanism which is actuated at predetermined intervals to grab an assembly line article, and, upon rotation of the clamping means and drum, to reverse such article. The article is subsequently released at a predetermined time or at predetermined position of the next oncoming article thereby to fall either on the belt or upon another article, which was allowed to pass the reversing mechanism, for further article processing or packaging. In the event pairing of articles is being performed in the fabrication process, the release mechanism, used in conjunction with the drum and the clamping mechanism, is such that the article is not released until it is capable, when thus released, of properly mating with the next shingle. Thus, for example, variable spacings between the articles or stoppages of the conveyor line do not deleteriously affect the flipping mechanism in the sense of throwing the mechanism out of synchronism with the article conveyor line.

Articles of manufacture, such as, flexible shingles, and the like, are fabricated at a high rate of production. In rotating the drum and clamping mechanism, it is necessary that such mechanism commence rotating and also be braked to a halt almost instantaneously to keep pace with the high rate of conveyor speed or rate of article feed. This is accomplished by providing a constant drive to the drum mechanism and by the insertion of an intervening clutch mechanism which applies a constant driving torque to the drum. When the drum is in a position capable of rotation, this constantly applied torque is immediately applied to have thereby the drum commencing to rotate at the design rate of speed. To halt this rotation at predetermined intervals, an ear is provided on the drum which engages a braking projection thereby discontinuing any further rotation of the drum and clamping mechanism.

In the event an article jam occurs or tends to occur adjacent the reversing mechanism, the deflecting structure, used to deflect the articles into the clamping mechanism, is such that the deflector may be rendered inoperative. This permits the articles to by-pass the reversing mechanism; once the malfunction has been corrected, the deflector resumes normal operation automatically to deflect the articles into the clamping mechanism for reversal.

In order to accomplish the various objectives of this invention, novel control means are provided which properly time the operation of the various components, as, for example, the rotation of the drum, the deflecting of selected articles, the braking actions, and the clamping and subsequent release of the conveyed articles. The control mechanism is such that it is controlled by the articles conveyed; for example, the leading and trailing edges of the articles conveyed are the main points used to activate the control system and subsequent activation, by the control mechanism, of the various components of the reversing mechanism. Variables in the fabricating process, such as, the length of the article, conveyor speed, and conveyor spacing, do not affect the control system, or the reversing mechanism but are automatically compensated for.

The invention will be more fully understood and further objects and advantages thereof will become apparent when reference is made to the following more detailed description of a preferred embodiment of the invention and the accompanying drawings in which:

FIG. 6 is a front elevation view of the flipping mechanism;

FIG. 7 is a plan view, partially in cross-section, of the flipping mechanism illustrated in FIG. 6;

FIG. 8 is a cross-sectional view along section lines 8—8 in FIGS. 6 and 7;

FIG. 9 is an end view of the right side of the flipper illustrated in FIG. 7;

FIG. 10 is an enlarged cross-sectional view of the rotating drum with a showing of a portion of the attached structure;

FIG. 11 is a cross-sectional view along lines 11—11 in FIG. 10;

FIG. 12 is an enlarged, partial-detail, plan view, partially in cross-section, of the ratchet and pawl mechanism and the drum braking mechanism;

FIG. 13 is an enlarged, elevation view of the ratchet and pawl mechanism and the braking mechanism illustrated in FIG. 12;

FIG. 14 is an enlarged, partial-detail, front elevation view, with certain parts cut away, of the drum trip mechanism, drum, and shock-absorbing mechanism;

FIG. 15 is a partial cross-sectional, side elevation view of the drum trip unit and shock absorber depicted in FIG. 14;

FIG. 16 is an enlarged, plan view, partially in cross-section, of the shingle clamp and cam roller sub-assembly;

FIG. 17 is an enlarged, end elevation view, partially in cross-section, of the clamp and roller illustrated in FIG. 16;

FIG. 18 is an enlarged, partial-detail view of the clamp cam sub-assembly and a portion of the clamp trip arm;

FIG. 19 is a side elevation view, partially in cross-section, of the cam sub-assembly depicted in FIG. 18;

FIG. 20 is an enlarged, partial-detail, elevational view, partially in cross-section and with certain parts cut away, of the trip arm sub-assembly;

FIG. 21 is a side elevation view, partially in cross-section, of the trip arm sub-assembly shown in FIG. 20;

FIG. 25 is a cross-sectional view taken along lines 25—25 of FIG. 24;

FIG. 26 is a partial cross-sectional view of the control cam sub-assembly taken along lines 26—26 of FIG. 22; and FIG. 27 is also a partial cross-sectional view of the control cam sub-assembly taken along lines 27—27 of FIG. 22.

Figure 1:
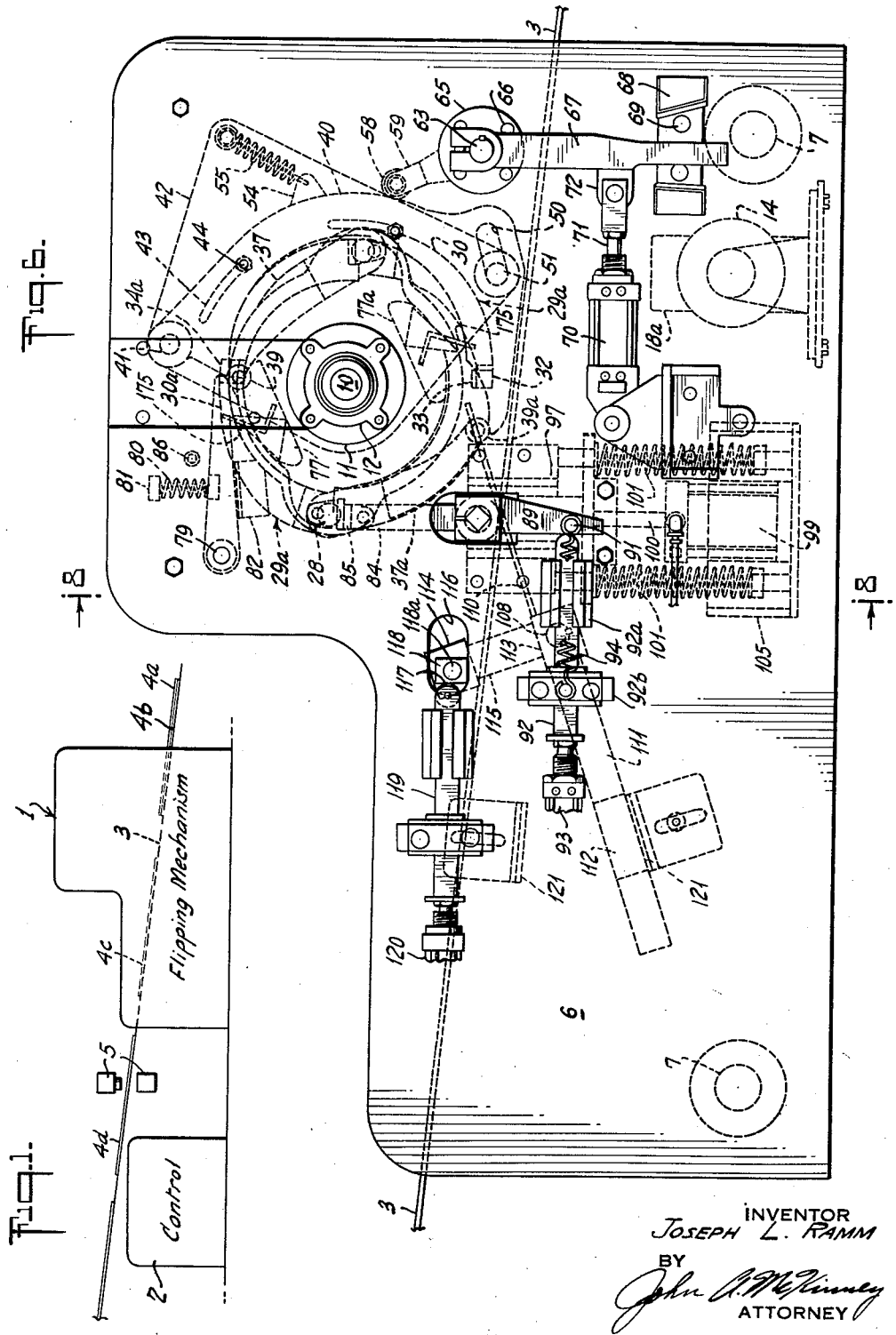
FIG. 1 is a diagrammatic view of the flipping mechanism and its associated controls relative to an article conveyor line.

The location of my reversing mechanism or flipper relative to a conveyor system is diagrammatically illustrated in FIG. 1. The flipping mechanism 1 sandwiches the conveyor belt 3 in a position either to grab an oncoming shingle 4c or to allow this shingle 4c to pass through or by itself. A pair of successive shingles 4c, 4d are depicted as entering the flipper 1, and a second pair 4a, 4b are shown to be leaving or passing the flipping mechanism after having been paired by the flipper. The control unit 2 may be located in any convenient, accessible place adjacent the flipper, as its means of connection to the flipper are by hydraulic, air, and electrical lines. The photoelectric unit 5 is mounted adjacent the belt 3 and precedes the flipper 1; the position and type of the unit are such that the light beam of the photoelectric unit 5 is unbroken when a shingle gap occurs and is broken when a shingle on the belt 3 passes by the light beam of the unit. Severing of the light beam affects control unit 2 to commence operation of the reversing unit in a predetermined cycle.

Figure 2:
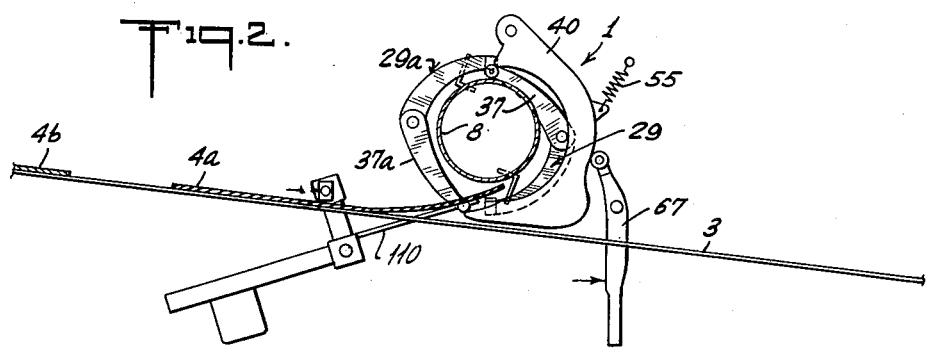
FIGS. 2, 3, 4 and 5 are simplified pictorial views of the flipping mechanism illustrating the basic principles of operation of the article flipper.
Figure 3:
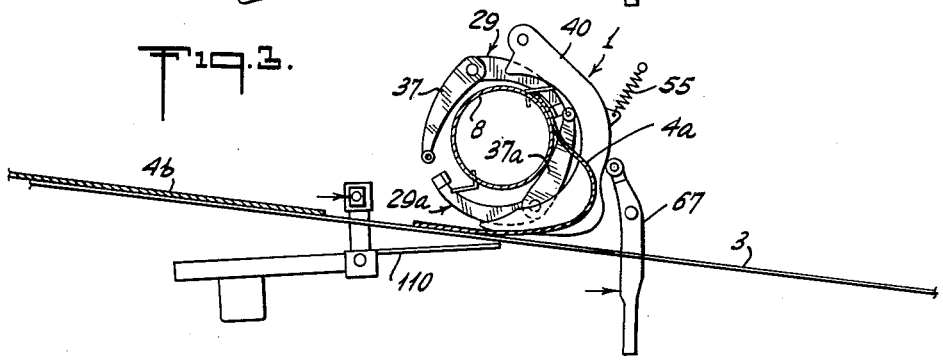

To obtain an overall view and a consequent better understanding of the operation of the reversing mechanism, FIGS. 2–5 diagrammatically and dramatically illustrate a cycle of operation during a reversal of a shingle and subsequent pairing with another shingle. Referring to FIG. 2, the flipper 1, depicted by some of its essential components in simplified form, is situated for the most part above the conveyor belt 3, which carries a plurality of shingles 4a, 4b, 4c thereon. The deflecting fingers 110 are in their elevated position, and are shown deflecting the first shingle 4a into clamp 29, the latter consisting of a group of elements retained to drum 8. At a predetermined point of entry between the drum 8 and clamp 30, the drum begins to rotate. The operating arm 37 is released from cam 40 forcing clamp 29 against the drum and thereby holding fast the shingle between itself and the drum 8.

The drum continues to rotate (FIG. 3), and the flexible shingle 4a commences to reverse in part. Simultaneously, fingers 110 are depressed after a predetermined degree of rotation of the drum. Meanwhile, the operating arm 37a bears against cam 40 and thereby spaces clamp 29a, not retaining a shingle, from the drum (or placing it in a shingle receiving position).

Figure 4:
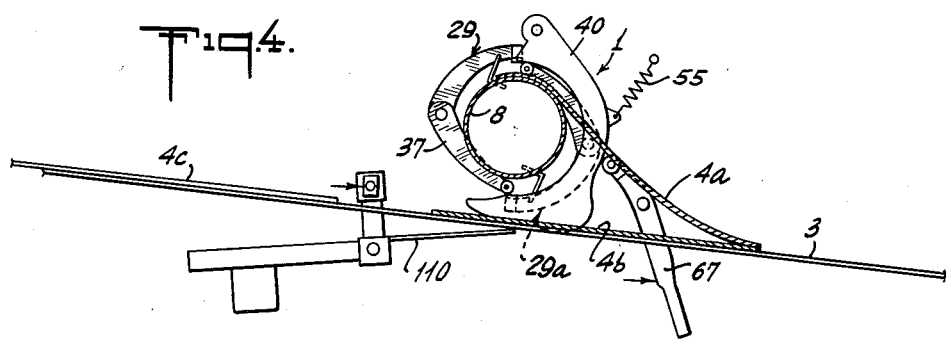
Figure 5:
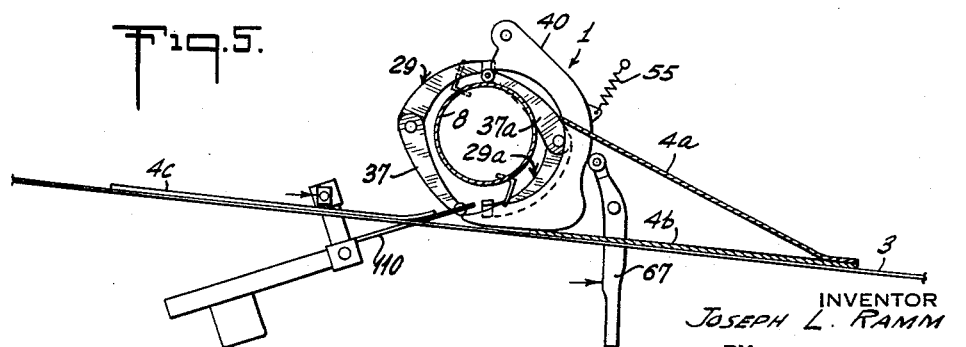

Upon 180° revolution of the drum and the held shingle, the drum is braked to a complete, instantaneous stop. At this point, shingle 4a is almost completely reversed, and travel of conveyor belt 3 completes reversal of shingle 4a. Depressed fingers 110 permit the next oncoming shingle 4b to pass the reversing mechanism non-deflected until it is conveyed by the belt to a position where its forward edge is about to mate with the now-forward edge of shingle 4a (FIG. 4). At this stage in the cycle of flipping, drum 8 is at rest and shingle 4a is retained in clamp 29 until shingle 4b interrupts the light beam and starts cycle of switch control unit 2 (FIG. 1) which causes cam operating arm 67 to rotate around its pivot moving cam 40, against the bias of spring 55, about its pivot. Arm 37, associated with the retained shingle, rides upon the forward lip of cam 40 and subsequently springs back shingle retaining clamp 29 to release shingle 4a (FIG. 4). Shingles 4a and 4b gradually mate along their entire length (FIG. 5), and are conveyed, as a pair, to the next operating station on the conveyor belt, as, for example, packaging. Meanwhile, fingers 110 are again elevated to a deflecting position, operating arm 67 is deactivated to release cam 40, and clamp 29a is in an open position ready to receive the next shingle (4c) to be deflected.

It is readily evident, even from the simplified version of my invention just described, that almost all of the enumerated objects have been accomplished. Thus, the mechanism described can readily be utilized on existing conveyor belt facilities; the shingles are accurately and automatically paired; halts in the conveyor line do not affect the flipping mechanism; large gaps, created, as, for example, by the removal of defective shingles, do not affect the operation of the flipper as the flipper retains the grabbed shingle until the next conveyed shingle passes a predetermined point on the belt adjacent the flipper, and likewise, variable spacing between the shingles affects the shingle retention time in the same manner. It is also evident that even though the mechanism has been described, and more specifically described hereinafter, with respect to pairing of shingles, only slight modification of the timing mechanism is required to effect reversal of every article conveyed rather than each alternate article as described.

Referring now to the remaining figures and in particular to FIGS. 6, 7 and 8, the working and detailed embodiment of my invention will be hereinafter described.

Each of a pair of frames 6 is positioned on either side of a conveyor belt system 3, which belt system carries a plurality of articles of manufacture 4a, 4b, etc. being processed in an assembly fabricating line. The articles of manufacture in the instant application are flexible roofing or siding shingles; however, it is to be understood that other articles, as, for example other types of flexible shingles, certain types of paper products, flexible metal sheets, etc., may utilize my reversing mechanism also to good advantage. The word "shingles" will be used generically hereinafter to denote not only regular roofing and siding shingles but also any other such flexible articles with which the mechanism, described herein, can be used. The frames are positioned so that the belts 3 pass by the approximate middle portion thereof, and may be secured to any existing foundation structure (not shown), to provide the proper support for themselves and their attached mechanism; the spacing and rigidity of such frames is maintained by a plurality of spacer bars 7 secured thereto. Between the frames, a hollow cylindrical drum 8 is mounted for rotation by bearings 9 on a central shaft 10; the latter is properly journaled and sealed by appropriate bearings 11 and seals 12 on each of the frame sides 6. The shaft 10 extends on one side a short distance beyond the exterior portion of the frame to provide for mounting of a drive sprocket 13 thereto. The sprocket is coupled to a drive motor 14 via a sprocket chain 15 also wrapped around a second sprocket 16; the latter sprocket is rotated by the motor via appropriate shafts 17, 18, speed reducer 18a, and flexible coupling 19.

A drive clutch is contained internally of the drum 8 (FIGS. 7, 10 and 11). It comprises a pair of pressure plates 20 mounted on the shaft 10 internally of the drum and separated by a spring 21 so that the plate facing 22, attached to each pressure plate, bears against the internal, planar ends 8c, 8e of the drum. Appropriate spring seats 23 mate with each pressure plate 20 on one side and with the spring 21 on the opposite side to maintain the spring in proper alignment and compression.

Thus, via the clutch mechanism, the drum 8 is mounted for continuous rotation by the drive motor 14 except when restrained by mechanism hereinafter described. When such restraining action occurs, the spring 21 is further compressed by the two pressure plates 20 allowing the clutch facing 22 to slip along the internal ends 8c, 8e of the drum. When the restraining force is removed, spring 21 maintains the proper compression to maintain the two clutch facings 22 in driving contact with the planar, internal ends 8c, 8e of the drum thereby rotating the drum and its appended structure.

Extending from either side of the drum are a pair of flanges 24, 25 which are larger in diameter than the largest external diameter of the drum. Mounted in oppositely adjacent, aligned pairs to the flanges 24, 25 are a plurality of bearings 26; each bearing and mated flange portion is appropriately bored to receive a shingle clamp shaft 27 or 28; these shafts 27, 28 are therefore mounted at diametrically opposite points of the drum. Flange 25 is directly coupled to one end of the drum to which is also secured the drum cover 8c; flange 24, on the other hand, is coupled to the opposite end cover 8e via a connecting cylindrical tube 8d. Cover 8c also has secured thereto a cylindrical tube 8a which has an end flange 8b extending therefrom for attachment to the braking and ratchet and pawl mechanism hereinafter described. The main drum 8 and tube 8d are perforated by a plurality of ports 8f and 8g, respectively, to lighten the rotating assembly in order to reduce the degree of impact shock. Shingle stops 175 (FIG. 11) are secured on either side of the drum; the stops limit the degree of entry of each shingle into the clamping structure during a reversing cycle.

Shingle clamps 29 or 29a (FIGS. 6-9, 16 and 17) are secured to shafts 27, 28 respectively; the two clamps are identical except that certain elements of one are suffixed with an "a" for a simpler presentation. One of the similar clamps 29 comprises a pair of arms 30 journaled to the shaft 27 by fasteners 31, and a crossbar 32 couples the arms. The crossbar has appropriate friction material 33 secured thereto on the side facing the drum 8 for proper retainment of the shingle between the clamp 29 and the drum 8, upon actuation of the clamp. Between each pair of adjacent arms 30, on shaft 27, is a torsion spring 34 biasing the clamp 29 to a clamping position, i.e., towards the drum. The spring is properly spaced and compressed at one end by an adjuster bushing 35 and held in this position by a bushing lock 36; the opposite end 189 of the spring is secured to the drum 8. Shingle clamp shaft 27 has attached thereto a clamp operating arm 37 which is attached to a boss 38 secured to one end of the shaft; the boss is of the split nut type and is secured to the shaft 27 by tightening bolt 27b. At the free end of each arm is mounted a roller bearing 39, which acts as a cam roller for operating its operatively related arm 37.

The roller 39, at times, rides on the inner periphery of a clamp cam 40 (FIGS. 6-9, 18 and 19), whose inner periphery is spaced an approximately constant distance from the main shaft 10; the cam extends for approximately 180° about the main shaft. The cam 40 is pivoted at one extremity at pivot pin 41 which projects from a cam adjustment plate 42; the plate is secured to one of the frames 6 and is in the shape of a frustum of a triangle. Centrally located in the adjustment plate 42 are a pair of slots 43, in each of which is situated an adjustment bolt 44 anchored to the frame 6. A plate retainer 45 maintains the adjustment plate in proper relative position, is appropriately bored for proper fitting over the main shaft 10, and is secured thereto by conventional means. Thus, the adjustment plate is rotatable about plate retainer 45, and a particular adjustment can be made by rotating the plate about retainer 45 causing slots 43 to rotate about bolts 44; the particular adjustment of the plate can be fixed by tightening nuts 46 associated with the bolts. The shingle clamp cam 40 is rotatable about pivot pin 41; appropriate washers 47 and thrust washers 48 are utilized to facilitate this rotation and assist to hold the clamp in its relative position after nut 49 is tightened on the threaded end of pivot pin 41. At the opposite extremity of clamp cam 40 is a slot 50, which has projected therethrough a cam guide pin 51 projecting outward from a corner of the plate 42. The cam 40 is sandwiched by appropriate washers 52 and thrust washers 53 adjacent one end of the pin, and nut 54 on a threaded end portion of the pivot pin 41 retains these elements in place. Projecting from the outer circumference of the cam 40 is an ear 54; one end of a spring 55 is secured to the ear, and the opposite end of the spring is secured to a retainer pin 56 jutting from plate 42. The bias of the spring is such that the cam 40 has a tendency to move outwardly away from the drum when unrestrained by other means. For a major portion of its inner periphery, the cam 40 approximates a circle concentric with the shaft 10 except for its lip 57, which lip gradually joins the inner and outer extremities of the cam to provide an easy entry for the cam roller 39 or 39a.

A second cam roller 58 (referring now to FIGS. 20, 21, and 6-9) bears against the outer periphery of clamp cam 40, and is attached to cam operating arm 59. The extremity of the arm is yoked to straddle the roller and to provide thereby proper support for retainer pin 60 which is secured to the arm yoke by a flat washer 61 and a lock washer 62. The arm 59 has a split boss 59a at the opposite end, and is secured to a shaft 63 by the tightening of bolt 59b; the shaft is rotatably mounted relative to the frame 6 in a bearing mount 64 containing bushings 64a therein and which also has a circumferential flange 65 mated to the frame by a plurality of bolts 66. The bearing mount 64 and shaft 63 extend from within the frame structure, i.e., between the two frames 6, to the exterior of one of the frames. A second operating arm 67 is keyed to the shaft 63 by the tightening of bolt 67b in another split nut arrangement 67a and extends downwardly between a pair of cushioned stops 68; the latter are fastened by means of nuts and bolts 69 to the adjacent frame 6. The arm 67 is pivoted about its secured upper portion by an actuating fluid cylinder or motor 70 which has its plunger 71 pivoted to an ear 72 extending from the arm.

When the fluid motor 70 is actuated, it forces arm 67 against one of the stops 68, pivoting such arm and rotating shaft 63; simultaneously, arm 59 is pivoted thereby toward cam 40. Thus, when motor 70 is activated, roller 58 bears against the cam 40 forcing this cam inwardly toward the main shaft 10 against the biasing action of spring 55; the limit of travel of cam 40 is reached when an edge of slot 50 abuts pin 51. When the motor 70 is deactivated, roller 58 releases the pressure from the cam 40, and the spring 55 pulls the cam outwardly of the main shaft 10 until the opposite edge of slot 50 abuts pin 51.

Also secured to the drum 8 adjacent cam 40 are a ratchet and pawl stop assembly and a braking apparatus. The assembly and apparatus comprise an annular collar 73 (referring now to FIGS. 6–9, 12 and 13) mounted concentric to the drum shaft 10 and secured to an end flange 8b of the drum. A pair of projecting ears 74, 74a are spaced diametrically opposite each other on the collar, with each ear having secured thereto a flat stop portion 75 or 75a and mating cushioning means 76 or 76a. A pair of ratchets 77, 77a are bolted to the collar 73 for cooperative engagement with a pawl mechanism 78. The ratchet and pawl combination is related to the drum so that free rotation of the drum and collar occurs in a counter-clockwise direction and a locking or holding action occurs if the drum and attached collar attempt to rotate in a clockwise direction. The pawl is appropriately pivoted, via a boss 85 and an internal bushing 84, at pin 79 which is secured to the frame 6, and is biased toward the ratchet 77 by a spring 80 situated between pawl 78 and a spring retainer 81 which is also secured to the frame 6. The downward limit of travel of the pawl 78 is set by a stop 82 which is also appropriately cushioned by an absorber 83 to absorb the shock of the downward movement of the pawl by the action of spring 80; the upward movement is limited by a pin stop 86 projecting from the frame 6.

To halt rotation of the collar 73 and the attached drum 8, the appropriate stop 75 or 75a is engaged by a drum trip arm 84, which arm not only acts as a halting mechanism but also as a release mechanism of the collar and drum and the associated clamps, in view of the continuous drive by motor 14. The arm 84 (referring to FIGS. 6–9, 14, 15) has a wear block 85 secured at its extremity; when the drum is not rotating, i.e., when it is braked, the block abuts one of the cushions 76, 76a. At its opposite end, arm 84 is mounted to a shaft 86 extending on both sides of one of the frames 6. The shaft is supported by a shock absorber slide 87; a cutout 88 is provided in the frame 6 to allow for upward and downward reciprocation of the slide 87. A release arm 89 is secured to that portion of the shaft 86 exterior of the frame and abuts against a collar 90 of the shaft. The arm 89 is abutted at its free end by a roller 91 which is rotatably mounted on a slide 92; the latter is supported by guide blocks 92a and is secured to an actuating fluid motor 93. Slide 92 operates in a reciprocating movement between cushion stops 92b and which are fastened by means of nuts and bolts to the adjacent frame 6. Spring 94, mounted between post 95 on the cushion stop 92b and post 96 on arm 89, biases arm 89 for constant contact between roller 91 and arm 89 regardless of the position of roller 91 or release arm 89.

The lower extremities of slide 87, interior of the frames 6, are guided for downward and upward reciprocation between a pair of guide blocks 97 mounted on one of the frames 6. The lowermost portion of slide 87 is mated to a cross plate 98, to which is attached a shock absorber 99 via a piston rod 100 passing through a piston rod guide block 100a. To further absorb the shock during the braking action and to return the slide 87 to the upward position, a plurality of cushioning springs 101 suspend downwardly from the cross plate 98. The lower extremity of each spring abuts an adjusting collar 102 while the upper extremity of each is retained by a retainer 103 attached to the cross plate. In view of the length of the spring absorbers, a guide rod 104 is located within the coil of each spring to maintain such springs in proper alignment. Each rod 104 extends through the bracket 105 in a loosely fit manner and is secured thereto by nut 106; the upper extremity of each rod extends through an appropriate bore in the cross plate and assists to guide the downward and upward reciprocation of the plate. Bracket 105 also provides a support for the shock absorber 99 and is rigidly secured to the frame by fasteners 107.

The arm 84 therefore is capable of both reciprocation and rotation. Under the action of fluid motor 93 and rod 92, release arm 89 rotates, and pivots therewith the drum trip arm 84. This rotation breaks the engagement of wear block 85 with ear stop and cushion 75, 76, allowing the drum 8 to rotate. After reverse rotation by motor 93 of the drum trip arm 89 and drum release arm 84 back to their original positions, the drum subsequently rotates to a position where the opposite ear stop and cushion 75a, 76a will ram the wear block 85. Further rotation of the drum is halted and the shock of this stopping action is absorbed by the combined action of shock absorber 99 and cushioning springs 101. Since cutout 88 is provided in the frame 6, slide 87 is allowed to reciprocate upward and downward freely within guide blocks 97. When such reciprocation occurs, release arm 89 has its lower side portion riding along roller 91. As the contact side of the release arm is linear, no sideways movement of either the arm 89 or the roller 91 occurs; the roller merely rotates on its pin support.

The shingle deflecting structure comprises a shaft 108 (referring now primarily to FIGS. 6 and 7), extended transversely between the two frames 6 and supported by bearings 109 attached to each frame. A plurality of deflecting fingers 110 are fixedly secured to the shaft 108 for rotation therewith and are spaced on the shaft relative to the conveyor belts 3 so that the fingers will project upward through the gaps between the belts when the fingers are in their deflecting position. In the common plane of the fingers 110 is situated a counterweight arm 111 extending from a boss 113 locked to the shaft 108 and to which arm is attached an adjustable deflecting finger counterweight 112. Also extending upward from the boss 113 is an arm 115 having an attached lug 114; the latter has a right angled extension 118 projecting through a slot 116 in the frame 6; the lug and extension are serratingly mated to provide a more positive engagement of the two elements. The extension 118 can be adjusted relative to the lug 114 to vary the point of contact by roller 117; this is accomplished by a slot 114a in lug 114, in which the nut and bolt means 118a ride. Thus, if the securing means 118a are loosened, projecting arm 115 and lug 114 can be moved slightly relative to extension 118; after a desired relative position is obtained, the nut and bolt fastener 118a is re-tightened and the serrated faces of lug 114 and extension 118 are locked. The net result of any change in adjustment is to alter the angle of the deflecting fingers in the "at rest" or deflecting position as the counterweight 112 always rotates arm 111 causing extension 118 to bear against roller 117. The roller is rotatably attached to one extremity of rod 119; the other extremity of the rod is fixed to the operating piston of fluid motor 120 in the usual manner. The upward and downward movements of the counterweight arm 111 are limited by stops 121 secured to the frame 6 and located on either side of the arm.

Figure 22:
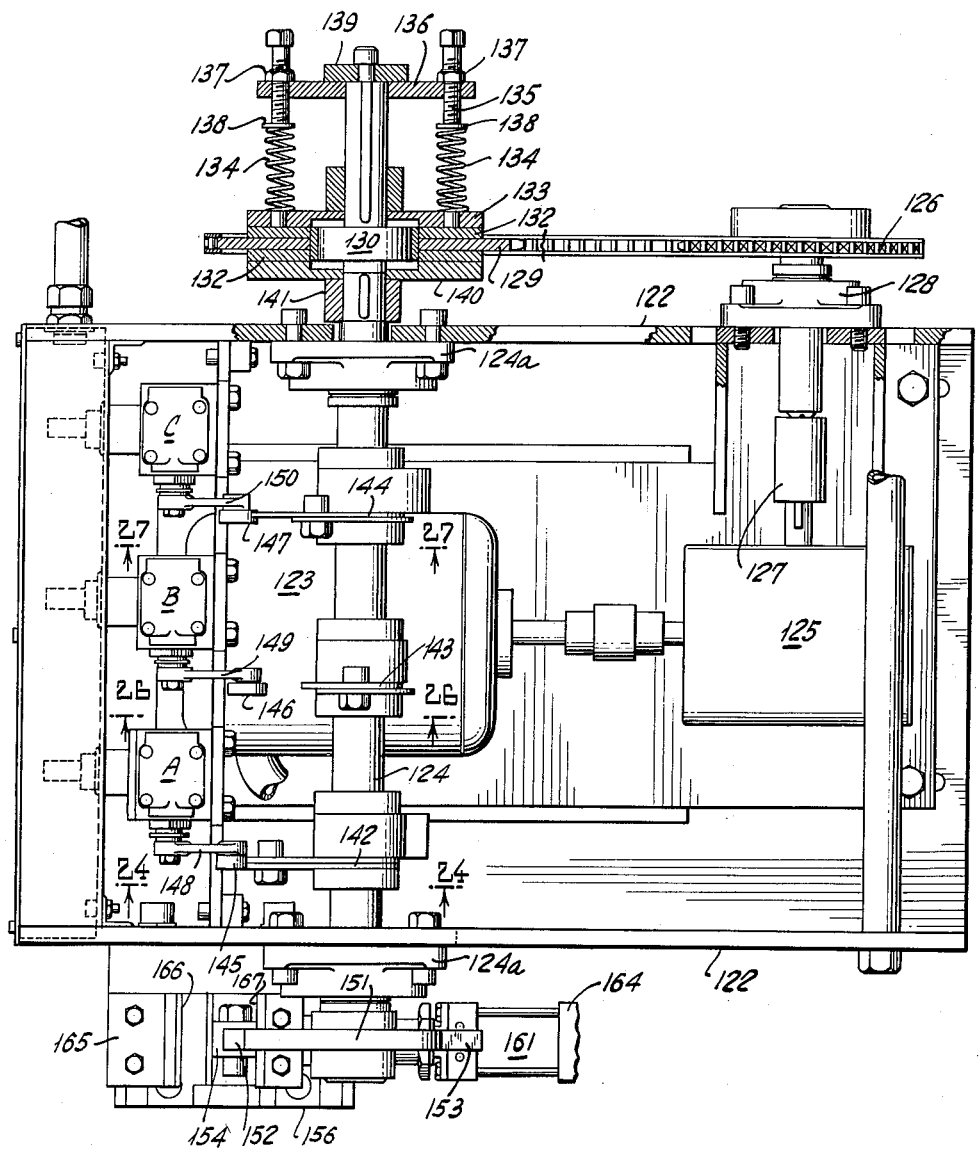
FIG. 22 is an enlarged, plan view with certain parts broken away and partially in cross-section, of the control unit diagrammatically illustrated in FIG. 1.
Figure 23:
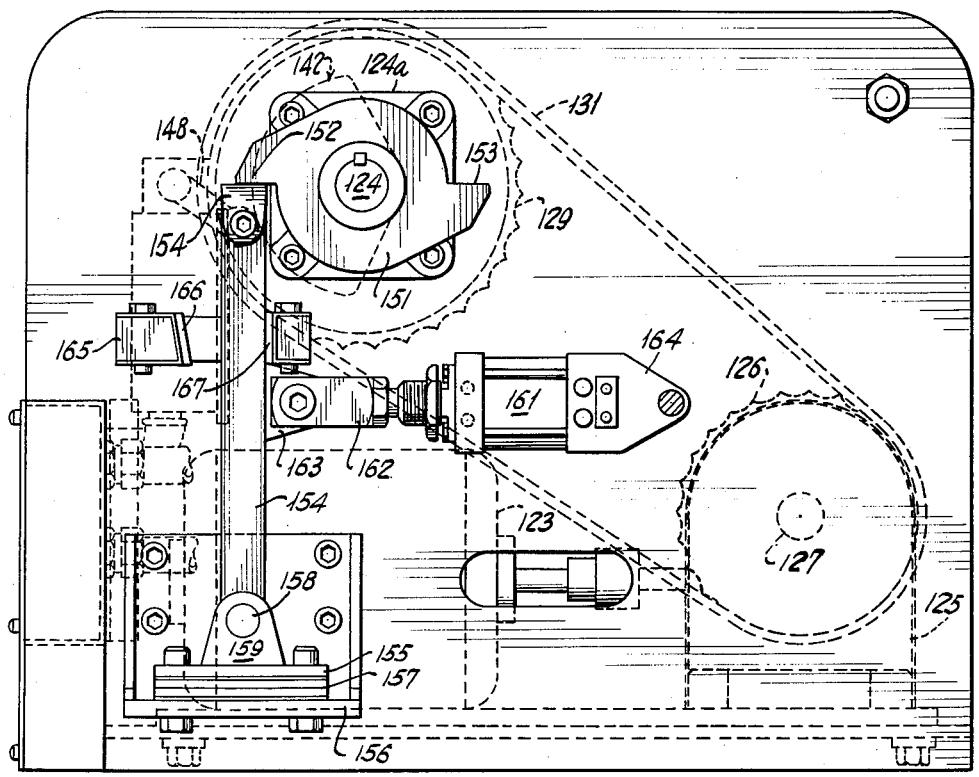
FIG. 23 is an elevation view of the control unit graphically shown in FIG. 22.

To operate the above recited mechanism in a timed and sequential relation, the actuating control system 2, shown diagrammatically in FIG. 1 and specifically illustrated by FIGS. 22, 23, is used. The system is independent of the flipper mechanism and can be located relative to the conveyor belts and the reversing mechanism at any convenient location, as, for example, shown in FIG. 1. Referring to the specific illustrations, frame 122 has housed therein a motor 123, which motor is separate and distinct of the drive motor 14 of the flipping mechanism.

A timing shaft 124 is journaled between opposite walls of the frame 122 by appropriate bearings 124a and is rotated by the motor through an appropriate speed reducer 125, to which is operatively connected a sprocket 126 via shaft 127 journaled by bearing 128. A corresponding sprocket 129 is attached to timing shaft 124 by journal 130, and the two sprockets are coupled by a drive chain 131. A clutch mechanism straddles the sprocket 129 to provide the proper timed drive or slippage to the shaft 124. It comprises a pair of friction linings 132 on either side of the sprocket 129; to one of the pair is secured a pressure plate 133 which is kept in operative engagement with the sprocket via the adjacent lining 132 by the bias of clutch springs 134. The compression of the springs is adjusted by means of screws 135 mounted in a tension plate 136 secured to one extremity of the shaft 124; a particular compression adjustment is locked by means of lock nuts 137 on screw 135. Retainers 138 abut the screws 135 providing the direct pressure on the springs and help to maintain the springs 134 in proper alignment. A retainer 139 maintains the tension plate 136 in proper position relative to the pressure plate. At the opposite side of the sprocket 129, the mating lining 132 is bonded to a second clutch plate 140, the latter of which is secured to the shaft 124 by appropriate locking spacer 141.

Mounted on the shaft 124, interiorly of the casing, are three cams, 142, 143, 144, against which bear rollers 145, 146, 147 respectively. The rollers are attached to operating arms 148, 149, 150, which actuate at proper intervals timing switch mechanisms A, B, C, respectively. Each timing switch A, B or C comprises a micro-switch, and an appropriately actuated servo-valve activated by the micro-switch. Each valve controls the action within air or hydraulic fluid lines by its respective valve, and each of such fluid lines is connected to an appropriate one of the cylinders or fluid motors of the flipping mechanism. Thus, the line conducting compressed air or hydraulic fluid controlled by switch A is coupled to fluid motor 120; the fluid line associated with switch B is coupled to air motor 93, and the line associated with switch C is coupled to fluid motor 70. The various piping arrangements necessary are conventional and hence have been omitted for the sake of clarity; however, it is to be understood that the various component parts, such as lubricators, filters, appropriate valves, etc., are necessary for the proper operation of the combined mechanism. These means are well known in the art and the proper hook-up arrangement can be made without adding to or detracting from the invention.

Figure 24:
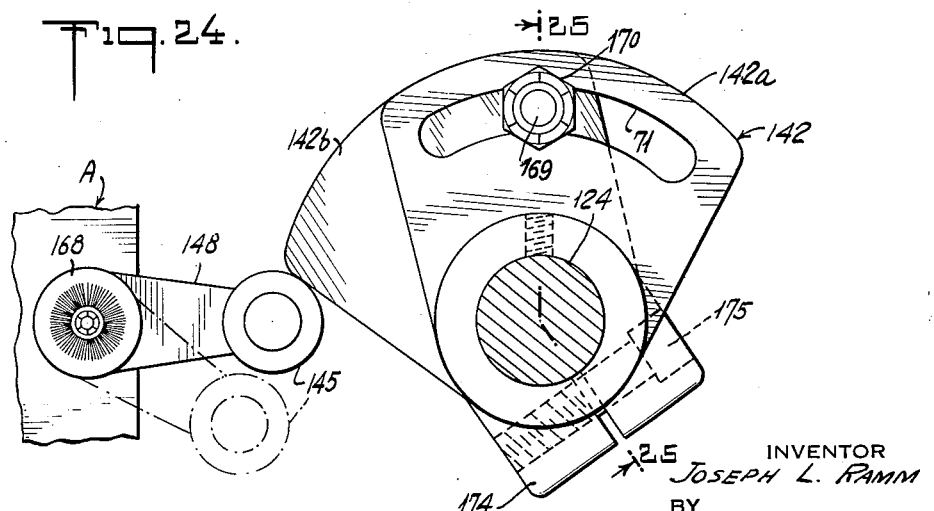
FIG. 24 is an enlarged cross-sectional view of one of the control cam sub-assemblies and taken along lines 24—24 of FIG. 22.

FIGS. 24–27 illustrate the relative sizes of the cams used and their relative initial switch actuating positions. Referring to FIGS. 24 and 25, cam 142 comprises a pair of thin plates 142a, 142b locked together by a bolt and nut 169, 170. The passage provided in cam plate 142b for the bolt 169 is merely a single port 171a; the passage provided in plate 142a is a slot 171. Thus, the two plates may be adjusted relative to each other by loosening the fastener 169, 170 and moving plate 142a about the bolt 169. The particular cam outline obtained is subsequently locked by re-tightening the fastener. The cam plate 142b is welded to a split nut type of bushing 174, which is fixed relative to the shaft 124 by tightening bolt 175. Collars 172 on both sides of the cam 142 are locked to the timing shaft by set screws and prevent creeping of the cam from its desired adjusted position. The cam actuates a cam roller 145 mounted on a switch arm 148; spring 168 located between the arm and switch biases the roller to an approximately horizontal position when the cam is not in contact with the roller.

Cams 143 and 144 are of a similar construction and need not be explained further; like numerals have been used in these two cams for some of the corresponding parts in cam 142 described. It is seen, however, that cam 142 has the greatest actuating surface while cam 143 has the smallest actuating surface. Also, their relative positions at the beginning of a flipping cycle are such that the rollers 145 and 147 are actuated by their respective cams while roller 146 is not activated.

Shaft 124 (referring back to FIGS. 22 and 23) also extends exteriorly of the frame 122 at the side opposite the clutch. To this exterior extremity of the shaft is keyed a two-position stop 151, which has a pair of diametrically opposite ears 152, 153 projecting therefrom to form the actual stop portions of the mechanism. Each ear is intended to abut against a trip arm 154 or to be released from such arm at appropriate timed intervals. The arm 154 projects upwardly from a base 155 secured to a frame 156; cushioning means 157 are located between the base 155 and the frame 156 to absorb the shock of the stopping action. The lower extremity of the arm is secured to the base 155 by pivot pin 158 secured to two ears 159 projecting from the base; the rotation of arm 154 about pivot 158 in either direction is limited to a small arc by stop 165 mounted to the frame 122. As in the other stop construction, cushioning means 166, 167 are appropriately provided for the stop to absorb the shock of the stopping action. At right angles to the arm 154, a fluid motor 161 is fastened to the frame and has its operating arm 162 pivoted to the trip arm 154 at lug 163. Thus, upon actuation of the motor 161, arm 154 is arced slightly in a counter-clockwise direction and is disengaged from one of the ears 152 of the stop 151, allowing rotation of the main timing shaft 124 by the drive motor 123; prior to 180° of rotation of shaft 124, motor 161 is deactivated returning arm 154 to a position ready to be abutted by the opposite ear 153 of the stop.

Photoelectric unit 5 (FIG. 1) is properly positioned relative to the conveyor belts 3 to be actuated upon a passing of a shingle. The electric servo-valve mechanism 164 is operated by the photo cell circuit to actuate the fluid motor 161. The circuit details for the photoelectric mechanism have not been illustrated as such details are well-known, and the various components can be purchased commercially. Likewise, the air or hydraulic fluid operating system for motor 161 has not been explicitly given as the piping arrangement necessary to operate such motor under the action of the photo cell is also well-known.

In the operation of the complete reversing unit, referring now mainly to FIGS. 6–9 when the flipper is involved and to FIGS. 22 and 23 when the control unit is described functionally, both the timing unit and the flipping mechanism have their own separate sources of drive power; this power is constantly applied to each shaft, so that, upon removal of the restraining force on either shaft, the respective shaft turns at the proper speed almost instantaneously. Thus, motor 14 drives the drum 8 through the intermediate coupling mechanism while motor 123 rotates shaft 124 through its intermediate coupling mechanism. The shingles or other articles of manufacture rest upon conveyor belts 3 and travel with the belts at the same speed. When the light beam of photocell 5 is cut by the forward or leading edge of a shingle, this action starts the timing mechanism operating. The position of switch A, prior to this cutting, is such that fluid motor 120 associated therewith is deactivated, i.e., it is in its retracted position. In this state, the deflecting fingers 110 project upward through gaps between the belts 3 to deflect the oncoming shingle into the flipping mechanism; the degree of shingle entry is limited by stops 175 secured to drum 8 to prevent too deep a penetration of the shingle into the clamping mechanism. It is noted that lug 114 and roller 117 are not directly connected to each other but rely upon the counterweight 112 to maintain the two elements always in an abutting relationship. Consequently, if for some reason a jam-up occurs, the shingle 4, because of its own momentum and the added force due to the jam, will force fingers 110 downwardly until their tips are in line with the conveyor belts. This allows the particular shingle to continue on the assembly line without being deflected into the reversing mechanism. This action of by-passing occurs, not only for the instant shingle but also is continued for all subsequent shingles, provided the jam remains in existence. If the jam is cleared, the only disadvantageous timing effect on the mechanism, in pairing, is that the next shingle continues on without having a shingle in the flipper to be paired with. This shingle can be easily removed from the assembly line manually and, the flipper and timing mechanism will be in proper position for the next shingle to obtain proper pairing.

When the electric eye mechanism 5 is operated, the electric servo-valve unit 164 is actuated to place into operation fluid motor 161. This motor projects its plunger 162 forward and forces trip arm 154 against the stop cushion 166 of stop 165. With this small arc rotation of the arm, the abutting ear 152 on the two-position stop 151 is separated from the upper extremity of arm 154, and the timing shaft 124 is placed into full rotation immediately by the action of the constant drive motor 123 through the clutch and drive mechanism 132–140. As noted, the position of the cam 142 associated with switch A is such that the fluid motor 120 associated with switch A is deactivated. Momentarily this deactivation continues. Upon further rotation of the timing shaft 124, cam 143 engages roller 146 to actuate switch B. The latter switch is associated with and is operatively connected to the drum trip fluid motor 93 so that motor 93 is energized forcing its plunger 92 forward and rotating release arm 89. The release arm in turn rotates shaft 86 and also rotates therewith drum trip arm 84. Upon the trip arm's rotation, block 85 disengages itself from stop 75, 76, associated with the collar 73, and the attached drum 8 is free to rotate under the power of the constant drive motor 14 through the associated coupling; thus, spring 21 forces clutch plates 20 against ends 8e, 8c to provide a positive drive to the drum. The position of the clamp mechanism 29 is such, relative to the drum, that it is ready to receive a shingle when such shingle is deflected upward between the drum and the cushion 33. Simultaneous with the shingle's entry between these two elements, the drum rotates taking with it clamp operating arm 37. With this slight rotation, the roller 39 on the arm disengages itself from the inner circumference of clamp cam 40. After the roller's passing of this inner circumference, the torsion spring 34 forces the entire clamp mechanism to slam against the drum thereby holding fast the shingle between the clamping mechanism 29 and the drum; the latter elements cooperate together as a single clamp with mechanism 29 acting as the movable part of the entire clamp and the drum 8 as the fixed part of the entire clamp. The drum continues to rotate with the shingle being thus attached thereto. After a predetermined degree of rotational travel, less than 180°, cam 142 rotates to a position where it disengages itself from roller 145 and switch A is activated. This switch operates the intermittent charging mechanism or pressure fluid line (not shown) to activate motor 120; the latter element projects its plunger 119 forward against the deflecting lug extension 118 to thereby rotate the deflecting fingers 110 to a position where the outer extremity of such fingers lies beneath the belts 3. At approximately the same moment, switch B is deactivated when roller 146 rides off cam 143; in turn, motor 93 is de-energized allowing release arm 89 and trip arm 84 to return to their original upright positions. At this time, the flipping drum mechanism and the timing mechanism shaft have nearly completed 180° of rotation. When the shingle end has passed the light beam of the photo cell 5, the beam is again uninterrupted whereby motor 161 is deactivated and trip arm 154 returns to its original upright position. The opposite ear 153 of the stop 151 slams against the upper extremity of arm 154; further rotation of timing shaft 124 is halted and the timing mechanism is now momentarily at rest.

Meanwhile, drum 8 has also completed almost 180° of rotation; fluid motor 93, which has been deactivated by switch B, has placed the trip arm 84 in its stopping or drum braking position. Upon completion of 180° of rotation, the stop 75a, 76a impacts against wear block 85 halting further rotation of the drum, the clamp, and the shingle. The shock of this stopping action is absorbed by the shock absorbing system, as noted heretofore. The major portion of the shock is absorbed by oil cushion cylinder 99, and springs 104 are used primarily to return the shock absorber system to its original position. The ratchet and pawl mechanism 77a, 78, which heretofore has allowed free rotation of the drum, prevents any reverse (clockwise) movement of the drum, and thereby also prevents any chattering of the drum. The drum is momentarily locked at rest by the abutment of stop 75a, 76a against wear block 85 and the holding action of the ratchet and pawl mechanism 77a, 78. With completion of 180° of rotation of shaft 10, the operating arm 37 is in a position where its associated roller 39 is about to enter the lip 57 of the cam 40.

The next oncoming shingle, say 4b, cuts the light beam of photoelectric unit 5; this again actuates servo-valve 164 to actuate motor 161, as before, to continue the timing mechanism on its second 180° of rotation. Rod 162 is plunged forward to release trip arm 154 from the ear stop 153 allowing such further rotation. As may be visualized from FIGS. 24, 26 and 27, the relative positions of the cams are such, i.e., 180° from their initial positions, that cam 142 leaves switch A in its activated position; in this position, the deflecting fingers are depressed permitting shingle 4b to continue by the flipper mechanism. Cam 143 leaves switch B in the deactivated position; in this position, release arm 89 and trip arm 84 are not moved; with this latter deactivation, drum 8 is prevented from rotating. Cam 144 also maintains switch C in the deactivated position, thereby preventing rotation of operating arm 67. Roller 58, therefore, does not exert any pressure on cam 40, and roller 39, entering cam lip 57, remains in its prior position preventing actuation of the clamp 29 and subsequent release of the first shingle.

The positions of switches B and C are maintained for the next full 180° rotation of the timing shaft. Switch A, on the other hand, prior to the second 180° rotation, is actuated by cam 142 and roller 145. This deactivates fluid motor 120, reversing the plunger 119 and roller 117, and deflecting fingers move into full deflecting position after the second shingle 4b has passed by. When the second shingle passes the light beam, the beam is once again continuous; valve 164 is de-energized to thereby deactivate or reverse fluid motor 161. This returns trip arm 154 to its upright position, and ear 152 of the stop 151 slams against the free end of the trip arm bringing the timing shaft to a sudden halt. Thus the timing shaft completes 360° of rotation for every 180° of rotation of the drum 8. Once again, switch A is activated while switches B and C are left in a position about to be activated by only a slight rotation of the timing shaft 124. The conveyor belt 3, of course, maintains its speed, and the forward edge of the second shingle 4b is moving to mate with the now-forward edge of the retained shingle 4a.

The third shingle 4c cuts the light beam once again. Fluid motor 161 is again actuated releasing trip arm 154 from ear 152, and the timing controls start their third 180° of rotation.

Upon further rotation of the timing shaft 124, cam 144 rotates to a position where it actuates arm 150 via roller 147 thereby actuating switch C. This switch, through the appropriate fluid piping arrangement, actuates fluid motor 70 whose plunger 71 moves forward to rotate arm 67. Shaft 63 is rotated simultaneously therewith, and cam operating arm 59 is likewise rotated. The associated cam roller 58 bears against the outer periphery of cam 40 forcing it inwardly against the bias of the spring 55. At this time, roller 39 has commenced to enter the lip 57 of the cam and it is moved toward the drum 8; this movement of the cam toward the drum forces the interconnected shingle clamp mechanism 29, against the bias of the clamp spring 34, to release the shingle. Also at this time, the grabbed shingle has completely reversed itself, and its constantly free extremity moves forward, thus reversed, to mate with the second shingle's forward end. Due to the gravity and inertia effect, the first shingle 4a gradually pairs itself along its entire length with the second shingle 4b. The two shingles continue on the conveyor belt thus mated.

Further rotation of the timing shaft 124 continues to maintain cam 142 actuating roller 145 and associated switch A. Switch A, prior to completion of the first 360° rotation of the timing shaft, had activated the fluid pressure system related with air motor 120 to retract plunger 119, and the counterweight mechanism 112 depended the lower end of the deflecting mechanism thereby elevating the deflecting fingers 110 to a position above the plane of the belts 3 where they are in a position to deflect the next or third oncoming shingle 4c into the turnover mechanism. Thus, the deflecting fingers are in a position to divert the shingles into the reversing mechanism ever 180° of the drum 8. This deflecting position is maintained for a short period of operation upon the starting of a new cycle, as herein described, after which, the cam roller 145 rides off the cam 142 returning switch A to its "at rest" position and ultimately allowing the deflecting fingers to be completely beneath or flush with the belt.

Also upon further rotation of timing shaft 124, cam 144 is soon placed in the position where it disengages itself from roller 147 thereby deactivating switch C. The latter switch, through the appropriate fluid system, reverses or releases the pressure in fluid motor 70, which, in turn, reverses plunger 71 to its normal "at rest" position. Arm 67 follows the movement of plunger 71 and also returns to its normal position. The pressure of cam roller 58 is released from the outer periphery of the shingle clamp cam 40, and the bias of spring 55 returns clamp cam 40 to its original position. Since roller 39 has fully entered the inner periphery of clamp cam 40, it no longer needs the inwardly forcing action to maintain clamp 29 in the open position and it rides along the inner periphery of cam 40 maintaining the clamp 29 in the open position. When the opposite extremity of the inner periphery of cam 40, i.e., adjacent the pivot 41, is reached, the roller 39 has completed 360° of rotation and remains there; upon further rotation, i.e., during the start of the next cycle, it will disengage itself from the cam 40 to produce the clamping action as noted heretofore. At the start of the second 180° rotation of the drum 8, the cam roller 39a is in this position, i.e., in contact with the inner periphery of cam 40 adjacent pivot pin 41. Clamp 29a is thereby maintained in an open, or shingle receiving, position. As a result, the third shingle 4c is deflected into the flipper between the drum 8 and clamp 29a. After slight rotation of the drum, roller 39a is freed of the cam 40 allowing the bias of spring 34a to slam the clamp 29a against the drum holding fast shingle 4c. This shingle thus commences to reverse itself upon continued rotation of the drum.

After the third shingle 4c has passed the light beam of photoelectric cell 5, the motor 161 is deactivated as before, and the timing shaft 124 is brought to an abrupt halt by the engagement of ear 152 with the uppermost extremity of trip arm 154.

Upon further rotation of the drum 8 to a position where 360° of rotation has been completed, it is brought to an abrupt halt by the contact of wear block 85 with stop mechanism 75, 76. Ratchet and pawl mechanism 77, 78 comes into play again to prevent further rotation of the drum in a reverse direction and thereby to prevent chattering of the drum. The shock of this halting is absorbed by the shock absorber and springs, as noted.

The timing mechanism thereafter continues on for a second complete 360° rotation; the drum 8 continues to remain in a standstill position to allow the fourth shingle 4d to pass by unaffected, and to allow the cams, associated with the timing shaft 124, to position themselves properly during the second 360° of rotation of the timing shaft 124.

It is evident from the preceding description, that the timing operation is not adversely affected in any way either by the spacing between shingles or by the fact that shingles may be removed or rejected from the line leaving large gaps between shingles. The difference in shingle spacings are automatically compensated for by the flipping mechanism which is affected only by a particular shingle reaching a predetermined point on the assembly line adjacent the flipping mechanism.

In addition, to adjust for differences in conveyor belt speeds, all that is necessary is to adjust the speed of rotation of each of the drive motors. This compensation will automatically adjust the timing sequence and the drum rotating speed; the major portions of the apparatus are not affected by variances in conveyor belt speeds since their activation is almost instantaneous, as, for example, the stopping mechanisms and the instant torque applied to the shafts by the drive motors.

While the operation has been described with particular reference to pairing of shingles, it is also evident that only a slight modification is required to effect reversal of all the shingles, or other similar articles of manufacture, on the conveyor assembly line if such is necessary for further processing. Thus, for example, if a second group of cams were to be located on the timing shaft, similar to the group shown and described but 180° out of phase, 180° rotation of the timing shaft 124 will also produce 180° rotation of the drum. Shingle 4a would be grabbed by clamp 29, shingle 4b would be grabbed by clamp 29a, shingle 4c would be grabbed by clamp 29, etc. In this particular modification, the drive motors would be adjusted to rotate at the same speed.

Likewise, numerous other slight modifications are possible, within the purview of this invention, to allow for slight differences in the assembly line product to be reversed or to obtain certain added features. For example, if it has been determined that a greater clamping action is desired because either the conveyed product is too heavy for the present clamp or faster speeds are required necessitating a faster clamping rate, suction means may be added internally of the drum 8. The latter element is described as being perforated; these perforations may be utilized to obtain a suction effect on the shingle, or other article, by connecting the drum to an air suction machine thereby increasing the clamping effect.

It will be understood that the details given are for the purpose of illustration, not restriction, and that variations within the spirit of the invention are intended to be included in the scope of the appended claims.

What I claim is:

1. In a mechanism for reversing flexible articles of manufacture conveyed on a conveyor comprising a rotating shaft, an article clamp operatively connected with said shaft, an article deflector to divert the conveyed articles into the clamp, and releasing means to release the article held by the clamp after a predetermined degree of rotation of the shaft.

2. In a mechanism for reversing flexible articles of manufacture comprising a rotating shaft, clamping means operatively connected with said shaft to rotate therewith, conveyor means conducting the articles by the shaft and clamping means, means to deflect alternate articles into the clamping mechanism, and means to release each clamped article after a predetermined time interval to allow such article to mate with a non-deflected article conveyed by the belt.

3. In a reversing mechanism for turning articles of manufacture conveyed on an article conveyor comprising intermittently rotating means, article clamping means operatively connected for rotation with said rotating means, means to deflect alternate articles conveyed by the conveyor into the clamping means, and means to release such clamped articles at predetermined time intervals for mating of such articles with non-deflected articles.

4. In a machine for reversing flexible articles of manufacture conveyed on a conveyor comprising rotating means, spring-biased article clamping means relatively fixed with relation to said rotating means, means to deflect at least alternate articles of manufacture conveyed by the conveyor into the clamping means, and means to release the clamped articles in a predetermined time sequence.

5. In a machine for reversing flexible articles of manufacture conveyed on a conveyor comprising rotatable means, article clamping means mounted on said rotatable means for rotation therewith, means to deflect at least alternate articles of manufacture conveyed by the conveyor into the clamping means, means to release the clamped articles, and means to control the action of said deflecting means, said clamping means, and said release means for operating them in a predetermined sequence.

6. In a reversing machine for turning over articles of manufacture conveyed by a conveyor comprising intermittently rotating means, clamping means associated with said rotating means for rotation therewith, deflecting means for deflecting at least alternate articles conveyed by the conveyor into said clamping means, spring means to bias said clamping means into an article clamping position, and cam-type actuating means to overcome said bias to force the clamping means into an article receiving position.

7. In a reversing machine for turning over articles of manufacture, conveyed by a conveyor, to their reverse side comprising a rotatable shaft, a drum encircling said shaft and mounted for rotation therewith, clamp means mounted on said drum, article deflecting means operatively associated with said clamp means for deflecting at least alternate articles conveyed by the conveyor, and means to activate and to deactivate the clamp means at predetermined timed intervals to clamp an article and to release such article upon reversal.

8. In a reversing mechanism, a conveyor, a plurality of shingles being conveyed by said conveyor, a rotating shaft, shingle receiving means mounted on said shaft for rotation therewith; means to deflect said shingles into the shingle receiving means, and means to release said shingles from the shingle receiving means after a predetermined degree of rotation of said receiving means.

9. In a reversing mechanism, a conveyor, a plurality of shingles conveyed by said conveyor, a rotating shaft, shingle grasping means mounted on said shaft for rotation therewith, means to deflect the shingles into the grasping means, cam means for actuating the shingle grasping means, and said cam means having a portion thereof being operatively connected with said rotating shaft.

10. In a reversing mechanism, a conveyor, a plurality of shingles conveyed by said conveyor, an intermittently rotating shaft, shingle grasping means mounted on said shaft for rotation therewith, means to deflect at least alternate shingles into the grasping means, means to activate said grasping means during a shingle deflection thereby to hold a shingle securely in said grasping means, means to release said grasped shingle after a predetermined degree of rotation of said grasping means, and means to brake said grasping means after a predetermined degree of rotation of said shingle grasping means.

11. In a mechanism for reversing articles of manufacture carried on a conveyor comprising a rotating main shaft, clamping means mounted on the shaft for at least partial rotation therewith, means to deflect at least alternate shingles into the clamping means, an intermittently rotating control shaft, means on said control shaft for controlling the timed sequence of operation of said clamping means and said deflecting means.

12. The mechanism as recited in claim 11, further comprising braking means for halting rotation of the control shaft, and additional braking means for halting rotation of the clamping means.

13. In a mechanism for reversing articles of manufacture carried on a conveyor comprising a rotating shaft, clamping means mounted on the shaft for intermittent rotation therewith, braking means for said clamping means, deflecting means for diverting at least alternate shingles into the clamping means, and control means for actuating said braking means to halt rotation of the clamping means.

14. In a mechanism for reversing articles of manufacture carried on a conveyor comprising clamping means, means to mount the clamping means for rotation about a central axis, means to deflect alternate articles conveyed into the clamping means, means for controlling the timed release of each article held in the clamping means so that, when thus released, it mates with a non-deflected article.

15. In a mechanism for reversing articles of manufacture carried on a conveyor comprising a rotating shaft, clamping means mounted on said shaft for rotation therewith and located approximately concentric thereto, actuating means operatively connected to said clamping means, means to deflect a conveyed article into the clamping means, cam means operatively connected with said actuating means thereby to activate and deactivate the clamping means at predetermined time intervals.

16. The mechanism of claim 15 further including braking means operatively connected to said clamping means, and control means operatively connected to said braking means either to apply or remove the braking action.

17. The mechanism of claim 15 wherein said cam means are pivotable, and control means operatively connected to said cam means to pivot such means thereby altering the camming action at predetermined intervals.

18. In a reversing mechanism for reversing articles of manufacture conveyed by a conveyor comprising rotating article clamp means, means to halt rotation of the clamp means at predetermined intervals, means to deflect at least alternate articles into the clamping means, a rotating control shaft, means on said shaft to control the operation of said halting means, and means for controlling the rotation of said control shaft relative to the rotation of the clamping means to a predetermined ratio.

19. In an article reversing and pairing mechanism, a conveyor, a plurality of articles of manufacture carried by the conveyor in a continuous series, rotating clamping means, means to deflect alternate articles conveyed by said belt into the clamping means, means to control the clamping action of the clamp means when an article is deflected into said means, and means to release the clamped article only after the next non-deflected article has passed a predetermined point past the clamp means so that the clamped article, when released, will be superposed upon the non-deflected article.

20. In an article reversing and pairing mechanism as recited in clam 19, further including braking means operatively connected to said clamping means, and control means operatively connected to said braking means to halt the clamping means temporarily prior to release of the shingle.

21. In an article reversing and pairing mechanism as recited in claim 20, further including restraining means to prevent reverse rotation of the clamping means when the latter means are braked to a stop.

22. In an article reversing and pairing mechanism as recited in claim 20, further including shock absorber means associated with said braking means to absorb the shock of the braking action.

23. In a reversing and pairing mechanism, a conveyor, a continuous succession of articles transported on said conveyor, rotating clamping means to grab predetermined articles on the conveyor means to deflect such predetermined articles into the clamping means, and means to render the deflecting means ineffective in the event of a jam-up of articles thereby having the articles by-pass the clamping means.

24. In a control system, a constant torque drive, a rotating shaft, a plurality of cams mounted on said shaft for rotation therewith, clutch means connected between said shaft and said drive, braking mechanism operatively connected to said shaft to halt rotation of the shaft at predetermined intervals and to cause slippage of said clutch, and brake control means to place the brake means in a braking position or to release such brake means to obtain thereby constant torque drive to said shaft.

25. In an asphalt flexible shingle fabricating system comprising means to convey the fabricated flexible shingles individually and in a continuous stream with the individual shingles being spaced from each other, means to deflect predetermined asphalt shingles being thusly conveyed, means to reverse the deflected shingles, and means to redeposit the reversed shingles upon the conveyor to be further conveyed.

26. In a flexible shingle fabricating system comprising means to convey the fabricated shingles in a continuous stream, means to deflect alternate shingles being thusly conveyed, and means to reverse the deflected shingles and to pair such shingles with conveyed shingles not deflected.

27. In a flexible shingle fabricating system comprising means to transport the fabricated shingles in a steady flow, mechanical means to elevate the forward edge of a flexible shingle and to hold said forward edge in a fixed position relative to the transporting means, and means to release the forward edge after the trailing edge of said shingle has passed the forward edge.

28. In an asphalt shingle fabricating system comprising means to fabricate individual asphalt shingles, conveyor means to transport the shingles in a continuous manner, and mechanical means superposed over a small portion of the conveyor means to reverse alternate asphalt shingles being conveyed.

References Cited in the file of this patent

UNITED STATES PATENTS

| | | |
|---|---|---|
| 1,063,860 | Cross | June 3, 1913 |
| 1,068,891 | Green | July 29, 1913 |
| 1,160,796 | Waite | Nov. 16, 1915 |
| 2,581,598 | Parker | Jan. 8, 1952 |
| 2,667,259 | Parker | Jan. 26, 1954 |